Dec. 11, 1962    R. A. CALENDINE ET AL    3,068,013
CABLE SPLICING SLEEVE
Filed Dec. 9, 1959
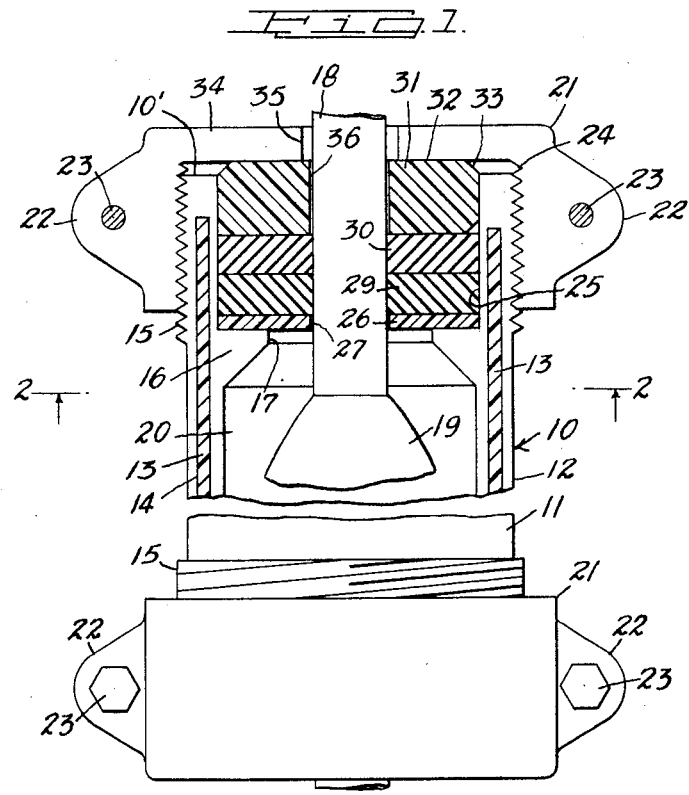
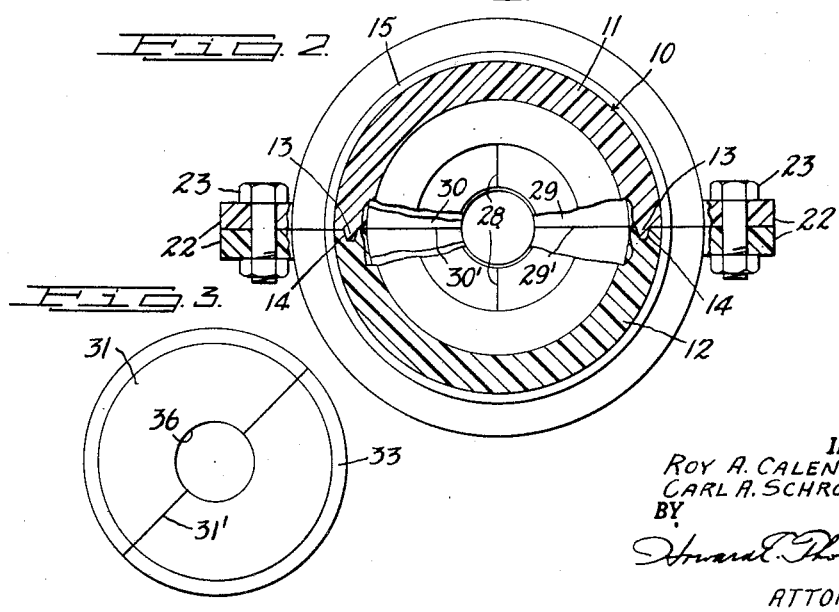
INVENTORS
ROY A. CALENDINE
CARL A. SCHROEDER
BY
ATTORNEY

United States Patent Office 3,068,013
Patented Dec. 11, 1962

3,068,013
CABLE SPLICING SLEEVE
Roy A. Calendine, 21 Morningside Drive, Croton-on-Hudson, N.Y., and Carl A. Schroeder, 144-35 Northern Blvd., Flushing, N. Y.
Filed Dec. 9, 1959, Ser. No. 858,424
5 Claims. (Cl. 277—63)

This invention relates to sleeves for providing a watertight seal around a splicing in cable. More particularly, the invention deals with a structure of this type and kind, wherein all of the parts are split to facilitate assemblage of the sleeve on a prepared splicing in forming a watertight protector for the splicing.

The novel features of the invention will be best understood from the following description, when taken together with the accompanying drawing, in which certain embodiments of the invention are disclosed and, in which, the separate parts are designated by suitable reference characters in each of the views and, in which:

FIG. 1 is a side and sectional view of end portions of a sleeve made according to our invention and diagrammatically illustrating part of a cable and splicing thereon.

FIG. 2 is a section on the line 2—2 of FIG. 1, with parts of the construction broken away to illustrate background showing and eliminating the cable; and FIG. 3 is a side view of the pressure ring shown in FIG. 1 detached.

In FIGS. 1 and 2 of the drawing, we have shown an elongated tubular casing 10, composed of two parts 11 and 12, adjacent edges of said parts having tongue and groove couplings defined by the tongues 13 on the part 11 and the grooves 14 on the part 12. End portions of the casing 10 are enlarged and externally threaded, as seen at 15, and it will be noted that the tongues and grooves of the casing parts extend well onto the threaded ends 15 and that one tongue and groove is longer than the other, namely the tongue and groove at the left of FIG. 1 of the drawing. This variation in length serves to properly aline the casing parts for alinement of the threaded ends 15.

The end portions of the casing also include inwardly extending annular seats, one of which is indicated at 16 in FIG. 1 of the drawing, the seat defining an annular passage 17, in which the cable 18 is arranged. The splicing 19 of the cable is disposed in the bore or chamber 20 of the casing 10.

As each end portion of the sleeve is of the same construction, the brief description of the one end will be applicable to both ends and, accordingly, like references will identify like parts. Adjustably mounted on the threaded ends 15 is a split cap 21, the separate parts of which have projecting apertured lugs 22 for reception of coupling bolts 23 securing the parts of the cap together, the caps being internally threaded, as seen at 24 in FIG. 1 of the drawing, to engage the threaded ends 15 of the casing 10. Outer ends of the casing 10 beyond the seat 16 include sealing chambers, one of which is seen at 25 in FIG. 1 of the drawing and in each of these chambers is a plastic disc 26 arranged upon the seat 16, the disc 26 having a bore 27 clearing the cable 18. For assemblage, the disc 26 is formed in two parts, as evident by the split line 28, note FIG. 2 of the drawing. This line is arranged vertically in said figure.

In the chamber, outwardly of the disc 26, are two sealing rings 29 and 30 composed of rubber, or synthetic rubber, and these rings normally fit snugly in the chamber 25 and upon the cable 18. The rings 29 and 30 are split, as seen at 29' and 30', and, in assemblage, the splits 29', 30' are arranged horizontally or substantially at right angles to the split 28, the split 29' being at one side of the casing and the split 30' being at the opposed side thereof. In FIG. 1 of the drawing, the sealing rings 29 and 30 are shown completely in section in FIG. 1 of the drawing. In other words, the split portions thereof are not shown in FIG. 1, it being understood, in this connection, that relative arrangement of these splits can be at the judgment of the operator, so long as the splits 29', 30' are not in alinement and are spaced with respect to other split portions of the assemblage.

Outwardly of the ring 30 a two-part pressure ring 31 is arranged in each of the chambers 25 and, in assemblage, the outer surface 32 of the ring 31 will be arranged well beyond each end of the casing 10, one of these ends being indicated at 10' in FIG. 1 of the drawing. The two parts of the ring 31 are formed by the split 31' note FIG. 3 of the drawing, and, in assemblage, this split is preferably arranged at a 45° angle to 28, 29' and 30'. It will also appear, from a consideration of FIG. 1 of the drawing, that the inner and outer corners of the ring 31 are bevelled, as indicated at 33. The diameter of the ring 31 is such as to fit snugly, but freely, in each of the chambers 25.

It will appear from a consideration of FIG. 1 of the drawing that each cap 21 includes an outer wall 34, having an aperture 35 therein freely receiving the cable 18. The disc 26, as well as the ring 31, are both made of rigid plastics and the entire casing 10, as well as the caps 21, are also preferably made of plastics. It will be apparent from a consideration of FIG. 1 of the drawing that, in moving the cap nuts 21 into operative position, the disc 31 will be forced inwardly, applying pressure upon the yieldable rings 29 and 30 to insure positive seal of the rings on the wall of each chamber 25 and upon the disc 26, as well as upon the cable enveloped by the disc and extending to the aperture 27 of the disc 26, as well as the aperture 36 in the pressure ring 31.

With this construction, it will be apparent that a positive seal is effected around the cable and in the chamber 25, preventing moisture from entering the chamber 20. The tongue and groove construction 13, 14 will also insure a positive seal of the chamber 20, particularly if a suitable cement or other compound is laid in the grooves 14 prior to placing the tongues 13 therein, this being done as and when the caps 20 have been assembled on the cable so that they can be coupled with the casings to firmly draw the casing parts together in effecting the desired seal between the casing parts, which extends to a point well beyond the portion of the threaded ends 15 engaged by the caps 21.

With our improved construction, it will be apparent that a splicing can be formed in a cable without having to preassemble casing parts on the cable, as with other devices of this type and kind, and, after the splicing has been formed, the various parts of the protective casing can be quickly and easily assembled and positioned on the spliced portion 19 of the cable in forming a substantially watertight protection for the splicing.

It will be apparent, from a consideration of the upper portion of FIG. 1 of the drawing, that the diameter of the chamber 25 is greater than the diameter of the chamber 20, so that pressure is taken up, not only by the seat 16, but also by the wall of the casing in the operation of compressing the flexible rings 29 and 30 to effect the seal, as previously described.

In fashioning the separate parts of the device of plastic material, it will be understood that the structure of the several parts can be modified and still adapt the device for mounting on a cable, particularly when the plastic material employed in the parts is sufficient to withstand flexure in assemblage on a cable. It is preferred, however, that the cap parts be each formed of two members which are bolted or otherwise fixedly secured together, as these caps form the pressure mediums for applying pressure to the sealing means in producing the sealed housing for the splicing, it being apparent, however, that the caps also serve to retain all of the parts in their assembled relationship.

Having fully described our invention, what we claim as new and desire to secure by Letters Patent is:

1. A cable splicing sleeve of the character described, comprising an elongated tubular casing split longitudinally to form two parts, said casing having externally threaded end portions, said casing being of one common internal and external diameter intermediate its ends, two-part caps in threaded engagement with the casing end portions, means for securing the cap parts together, each cap having end wall portions forming partial closures to one diameter, sealing chambers in and opening through outer ends of said casing, the casing parts including inwardly of and adjacent their ends inwardly projecting seats partially defining said chambers, a thin disc arranged on the seat in each of said chambers, a pressure ring of rigid material in the outer end of and projecting beyond each of said chambers, said pressure rings being engaged by the end wall portions of said caps, flexible sealing means in each chamber between the disc and ring, said caps, discs, rings and sealing means having substantially common diameter bores materially less in diameter than the internal diameter of said casing, said sealing means being adapted to form a seal around cable portions disposed in the bores of said sealing means and in said chambers upon application of pressure to each of said rings by said caps, the split of said casing parts forming adjacent longitudinally arranged surfaces, and means including a seal medium extending longitudinally of said adjacent surfaces for uniting said adjacent surfaces and said casing parts.

2. A sleeve as defined in claim 1, wherein said disc and ring are each composed of two parts facilitating assemblage thereto upon the cable.

3. A sleeve as defined in claim 1, wherein said sealing means is in the form of yieldable rings split in one wall for assemblage on cable disposed in said chambers, and compression of said rings by said caps effecting a positive seal of the cable in both of said sealing chambers.

4. A sleeve as defined in claim 1, wherein the diameter of the first named sealing chambers is greater than the internal diameter of said casing.

5. A sleeve as defined in claim 1, wherein said last named means includes tongue and groove engagements between and longitudinally of adjacent surfaces of the casing parts, and said tongue and groove engagements terminating inwardly of ends of the casing parts.

References Cited in the file of this patent

UNITED STATES PATENTS

| | | |
|---|---|---|
| 500,899 | Holmes | July 4, 1893 |
| 2,578,260 | McPherson et al. | Dec. 11, 1951 |
| 2,828,149 | Deventer | Mar. 25, 1958 |